United States Patent [19]

Rose, Jr.

[11] Patent Number: 4,765,462
[45] Date of Patent: Aug. 23, 1988

[54] NOTEBOOK FOR STORAGE OF COMPUTER DISKS AND LOOSE-LEAF DOCUMENTATION

[75] Inventor: Robert D. Rose, Jr., Englewood, Colo.

[73] Assignee: Communications Packaging Corporation, Denver, Colo.

[21] Appl. No.: 575,898

[22] Filed: Feb. 1, 1984

[51] Int. Cl.$^4$ .............................................. B65D 79/00
[52] U.S. Cl. ............................... 206/45.13; 206/45.18; 206/45.2; 206/45.24; 150/52 B
[58] Field of Search .... 206/45.18, 45.2, 45.21–45.227, 206/387; 150/52 B

[56] References Cited

U.S. PATENT DOCUMENTS

| | | | |
|---|---|---|---|
| 1,272,618 | 7/1918 | Burgess | 206/45.18 |
| 1,452,278 | 4/1923 | Kind | 206/45.23 |
| 1,863,047 | 6/1932 | Grimsley | 206/45.2 |
| 2,076,683 | 4/1937 | Tharp | 150/52 B |
| 2,116,481 | 5/1938 | Sweeney | 206/45.21 |
| 4,213,520 | 7/1980 | Sarna et al. | 206/45.23 |
| 4,225,038 | 9/1980 | Egly | 206/425 |
| 4,314,635 | 2/1982 | Fraser et al. | 206/425 |
| 4,407,410 | 10/1983 | Graetz et al. | 206/387 |
| 4,433,780 | 2/1984 | Ellis | 206/387 |

FOREIGN PATENT DOCUMENTS

| | | | |
|---|---|---|---|
| 326059 | 9/1920 | Fed. Rep. of Germany | 206/45.18 |
| 692332 | 11/1930 | France | 206/45.18 |
| 146906 | 7/1931 | Switzerland | 206/45.18 |

Primary Examiner—Joseph Man-Fu Moy
Attorney, Agent, or Firm—Gregg I. Anderson

[57] ABSTRACT

A notebook for storing computer disks and documentation related thereto is disclosed. The notebook includes an articulated four-piece cover. A front cover is hingeably connected through a spine to a back cover, which back cover is hingeably connected to an overlay cover. A storage receptacle including two mated portions is attached to an inner surface of the back cover and overlay cover for receipt of computer disks. An outer surface of the overlay cover includes a binder assembly to releasably hold loose-leaf documentation related to the computer disk being used. At the proximate edge of the overlay cover, on the surface opposite the surface to which the binding assembly is mounted, is formed a means for receiving a free edge of the front cover. The notebook therefore can assume a storage position in which the overlay cover lies adjacent to the back cover, sealing a computer disk in the storage receptacle, and an easel position, the free edge of the front cover being insertable into the receiving means of the overlay cover, supporting the documentation at an elevated position with respect to the back cover.

5 Claims, 2 Drawing Sheets

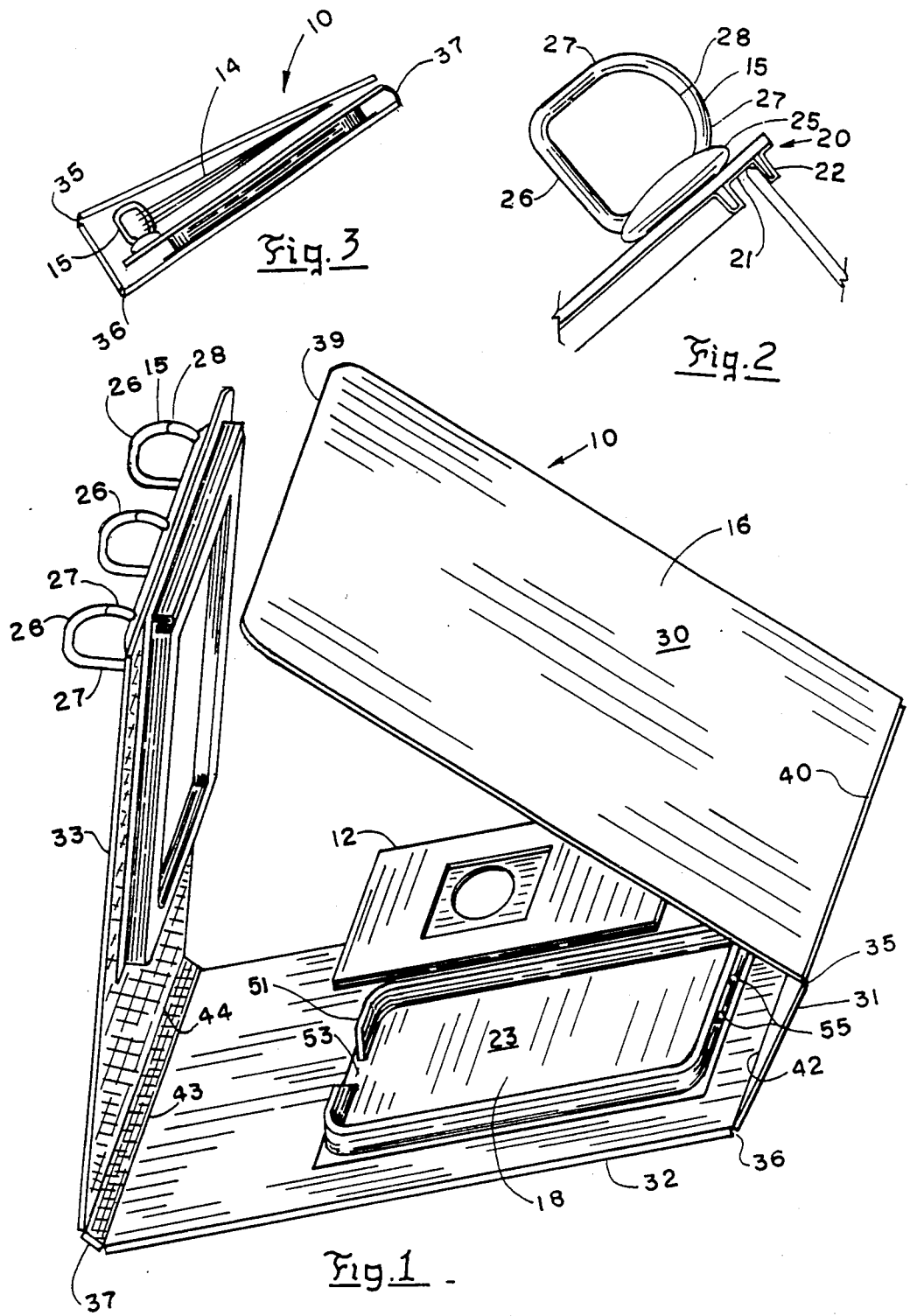

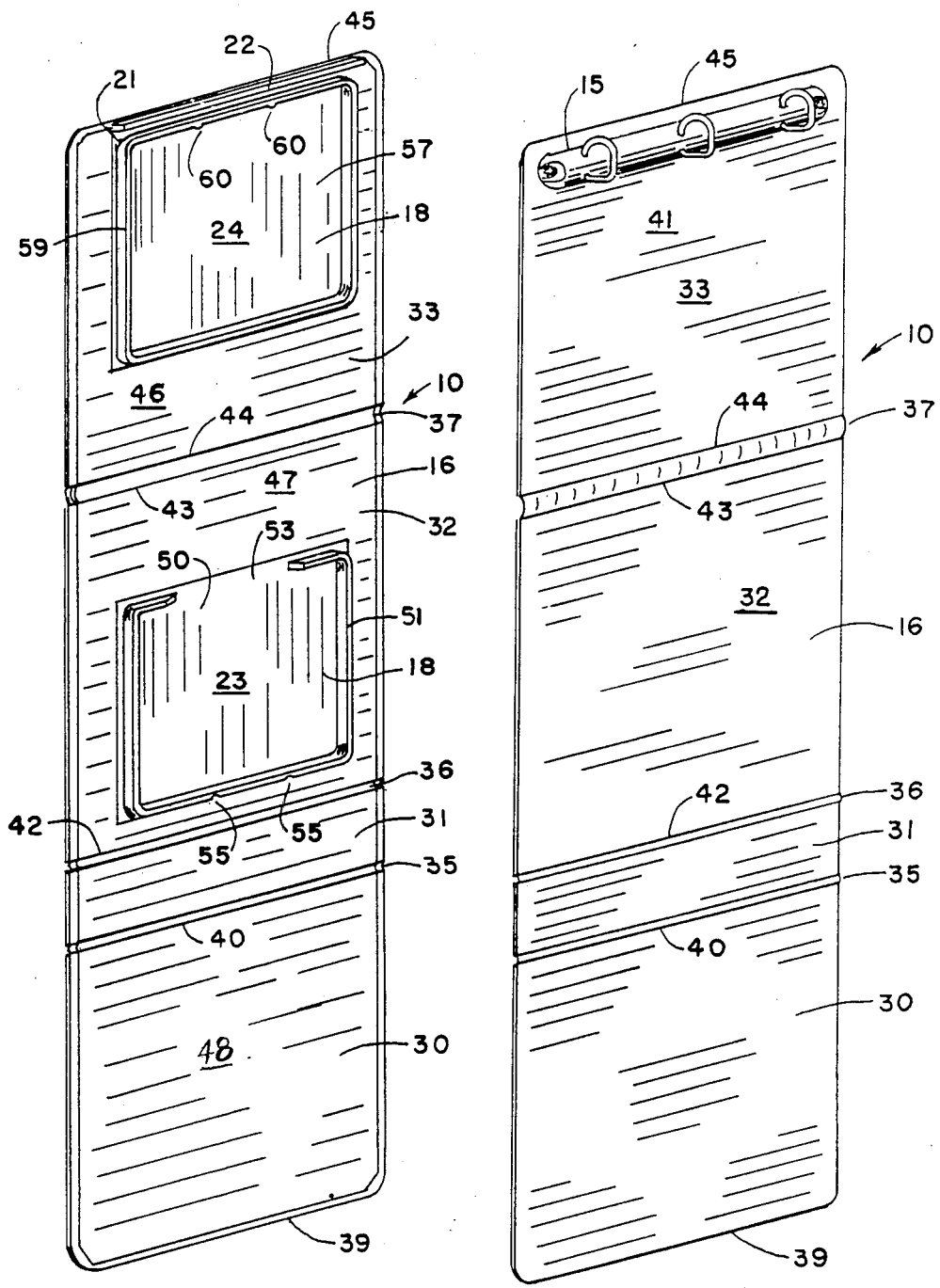

NOTEBOOK FOR STORAGE OF COMPUTER DISKS AND LOOSE-LEAF DOCUMENTATION

BACKGROUND OF THE INVENTION

1. Field of the Invention

The present invention relates to loose-leaf notebooks. More particularly, the present invention relates to loose-leaf notebooks that are used to store and retain written documentation and computer disks to which the written documentation pertains.

2. Description of the Prior Art

The personal or minicomputer uses floppy disks or diskettes to store programs and user supplied data. These floppy disks have been widely accepted in two sizes, five and one quarter inch and eight inch. In using a floppy disk as a program source, documentation is supplied as a part of the package purchased by the computer user. The documentation is normally supplied in a separate loose-leaf notebook or bound book.

Various storage cases for magnetic or floppy disks alone have heretofore been known. Examples are various patents issued to R. Egley, U.S. Pat. Nos. 4,225,038 and 4,369,879, as well as Design Pat. No. 251,273. It is also known to store magnetic disks in thermoformed containers, as seen in U.S. Pat. No. 3,864,755 to J. Hargis.

Composite loose-leaf notebooks for storing instructional materials and electronic components are seen in J. Gallaher, Jr., U.S. Pat. No. 4,157,757. Gallaher also shows separate compartments. The compartments can be released from the notebook. Similar notebooks or catalogs for storing electronic components are seen in J. Cooper, U.S. Pat. No. 4,274,537.

Another notebook is seen in the patent to R. Fulton, Jr., U.S. Pat. No. 4,259,799 wherein a notebook has two compartments. One compartment receives a notebook and the other compartment receives plastic frames. U.S. Pat. No. 3,837,680 to P. Cimini shows an overlay cover or leaf in connection with a loose-leaf notebook that separates documents stored into two different binders.

Easel-type notebooks are seen in K. Crawford, U.S. Pat. No. 4,355,821; J. O'Brien, U.S. Pat. No. 4,033,652 and E. Petersen, U.S. Pat. No. 3,682,433. An easel notebook with a variation of an overlay leaf or cover is seen in U.S. Pat. No. 3,913,740 to A. Bisberg. Bisberg shows the storage of slide transparencies wherein one of the cover leaves has a pair of overlay or enclosure leaves hingeably connected thereto. The Bisberg notebook can itself be bound into another three-ring notebook.

There is an easel-type notebook commercially available built along a principle similar to that shown in Crawford. The commercially available notebook has a fold-line in the cover transverse to a binder ring assembly. The commercially available product stores floppy disks which have previously been stored in plastic sleeves.

None of the prior art shows a hermetically sealed container for the computer disks formed integrally with the notebook itself. The prior art does not provide easy access to the documentation in either a conventional notebook position or a stable elevated easel position.

OBJECTS AND SUMMARY OF THE INVENTION

It is the principal object of the present invention to provide a storage notebook for floppy disks or diskettes and loose-leaf documentation associated with the disks.

It is a related object of the present invention to provide a notebook-type storage device for floppy disks or diskettes which may be used to support the loose-leaf documentation in a generally upright, easily accessible position when the disks are being used.

It is a further related object of the present invention to provide a notebook for storage of floppy disks or diskettes and documentation related thereto which protectively seals and stores the computer disks in an integral storage receptacle integral with the notebook.

In accordance with the objects of the invention, an easel-type storage notebook is provided including a binder ring assembly of snap-type loose-leaf rings for storage of documentation and a two-part sealed storage receptacle for receipt of computer floppy disks or diskettes, the storage receptacle integrally incorporated into the notebook. The notebook cover therefore includes three portions, a front, a back and an overlay portion. The overlay cover or portion is hingeably connected to one edge of the back portion and includes one part of the disk storage receptacle connected to one inner surface thereof. On the other outer surface of the overlay leaf, at the edge opposite the hingeable connection to the back cover, is securely mounted a binder ring assembly.

The outer surface of the overlay cover, at the edge to which is connected the binder ring assembly, is formed a channel or groove adjacent to the one part of the computer disk storage receptacle. In an easel position of the notebook, the groove or channel receives a free edge of the front cover.

The front cover, at an edge opposite the free edge, is hingeably connected to a spine. The spine is further connected to a second edge of the back cover by another flexible hinge connection.

The back cover is therefore hingeably connected to the overlay cover and through the spine, the front cover. An inner surface of the back cover has the other part of the storage receptacle for the computer disks.

The storage receptacle parts are aligned upon closure of the overlay cover against the back cover. Each part of the storage receptacle includes a flat backing portion connected to the inner surface of the overlay cover and the inner surface of the back cover respectively. Onto the backing portion of each part is integrally formed a raised rib defining a rectangular wall circumscribing an area essentially equal to that of the computer disk being used. The part of the storage receptacle mounted on the inner surface of the back cover is a male portion inserted into an opening of a female portion mounted to the inner surface of the overlay cover as the overlay cover is closed.

In a storage position of the notebook, one part of the storage receptacle mounted on the overlay cover is mated against the other part of the storage receptacle located on the back cover. The storage receptacle seals at least one floppy disk therein. The binder rings carry documentation for the disks. The documentation lays on the outer surface of the overlay cover. The spine raises the front cover above the binder rings and permits the front cover to lay over the documentation, defining a notebook.

In the easel position, the overlay cover is raised and the free edge of the front cover inserted into the channel at the edge of the overlay cover. The disk is removed from the storage receptacle and inserted into a personal or minicomputer. The documentation is held in the binder ring assembly secured to the overlay cover, which is held at an elevated position by the front cover.

DESCRIPTION OF THE DRAWINGS

FIG. 1 is a perspective view of a storage notebook for documentation and computer disks of the present invention, the notebook being shown without documentation generally in an easel position, a front cover being pulled away from an overlay cover for clarity.

FIG. 2 is a fragmentary side elevational view showing the front cover and overlay cover of the invention shown in FIG. 1 in the easel position.

FIG. 3 is a side elevational view of the invention shown in FIG. 1 in a storage position.

FIG. 4 is a perspective view of the invention shown in FIG. 1, the notebook being fully extended.

FIG. 5 is a view similar to that shown in FIG. 4 showing the opposite surface of the notebook in a fully extended position.

DESCRIPTION OF THE PREFERRED EMBODIMENT

A storage notebook 10 is seen in the drawing figures, including provision for storage of at least one computer disk or diskette 12, together with documentation 14 associated with the disk 12. The storage notebook 10 has a storage position (FIG. 3) in which the storage notebook 10 is similar in appearance to a conventional loose-leaf notebook. When in use, the storage notebook 10 assumes an easel position (FIGS. 1 and 2) wherein a binder ring assembly 15 which retains the documentation 14 is held at an elevated position by an articulating cover 16 of the storage notebook 10.

The disk 12 is maintained in a storage receptacle 18 integrally connected to the cover 16 of the storage notebook 10 when in the storage position. When in the easel position, the storage receptacle 18 for the disk 12 is opened and the disk 12 is easily accessed for use with a personal or minicomputer (not shown).

The storage notebook 10 includes the articulated cover 16, the disk storage receptacle 18, the binder ring assembly 15, and means for retaining the cover in the easel position 20. The binder ring assembly 15, or document retention mechanism, is of conventional construction and is commercially available. The ring assembly 15 includes a support member 25 secured to the cover 16 in a location and manner to be described hereinafter, and, in the embodiment shown, three snap binder rings 26. Each binder ring 26 is formed of two arcuate portions 27 which snap together at a juncture 28. Opening the rings 26 by spreading the two portions 27 at the juncture 28 allows for insertion or removal of the loose-leaf documentation 14.

The articulated cover 16 includes four pieces, a front cover 30, a spine 31, a back cover 32 and an overlay cover 33, all interconnected by three hinge connections 35, 36 and 37. The front cover 30 includes a free edge 39 and a hinged edge 40 connected by the flexible fabric hinge connection 35 of conventional notebook construction, to the spine 31. The front cover 30 is made of conventional fabric or vinyl covered cardboard construction defining an essentially square plan view. The dimensions are variable to accommodate generally the size of paper used in the documentation 14 printed to support the use of the computer disk 12 (FIGS. 3 and 5).

The spine 31 is oriented as it would be in a conventional notebook with respect to the front and back covers 30 and 32. However, as will be described in more detail hereinafter, the binder ring assembly 15 is not connected to the spine 31, as would be the case in a conventional notebook. The spine 31 does have relationship to the binder ring assembly 15, as seen in FIG. 3. The spine 31 must be of sufficient width so as to support the front cover 30 above the rings 26 of the binder ring assembly 15 when the notebook 10 is in the storage position (FIG. 3). In the storage position, the overlay cover 33 lies generally adjacent to the back cover 32, the binder ring assembly 15 attached to the overlay cover 33 and projecting generally toward the front cover 30.

The second hinge connection 36 is constructed in a conventional manner along the spine 31 to connect the spine 31 to a first edge 42 of the back cover 32. The back cover 32 is constructed in identical manner to the front cover 30, having the same material construction and essentially the same dimensions. Opposite the hinge connection 36 to the spine, the back cover 32 has, along a second edge 43, the last conventional hinge connection 37 to a first edge 44 of the overlay cover 33. The overlay cover 33, at a second edge 45 opposite the hinge connection 37 at the first edge 44, has a groove or slot 21 providing the releasable connection means for retaining the cover in an easel position 20. The groove 21 receives the free edge 39 of the front cover 30 when the notebook 10 is placed in the easel position (FIG. 2). A portion of the groove 21 is established by a retainer wall 22 of thermoformed polyethylene plastic connected to an inner surface 46 of the overlay cover 33 at the second edge 45. The other portion of the groove 21 is defined by a second part 24 of the storage receptacle.

The back cover 32 and overlay cover 33 have inner surfaces 47 and 48 respectively which lie generally adjacent each other when the notebook 10 is in the storage position of FIG. 3. Another surface 41 of the overlay cover 33 has the binder assembly 15 connected thereto. It is on these inner surfaces 47 and 48 that an first part 23 and the second part 24 of the storage receptacle 18 for the computer disk 12 is mounted.

The articulated cover 16 is foldable about the hinge connections 35, 36 and 37 to either the storage or the easel position. All the hinge connections are perpendicular to a longitudinal axis of the cover (FIGS. 4 and 5). The binder ring assembly 15 is also mounted along a line parallel to the cover edges 39, 40, 42, 43, 44 and 45 and the hinge connections 35, 36 and 37.

The first part 23 of the storage receptacle 18 is mounted on the inner surface 47 of the back cover 32. The first part 23, as well as the second part 24, are made of thermoformed polypropylene plastic. A backing portion or panel 50 of the first part 23 is of generally square configuration and is connected by glueing or other means to the inner surface 47 of the back cover 32. Thermoformed in the back portion 50 is a ridge 51 of the first part 23 extending a predetermined height above the back portion 50 and around the periphery of the first part 23. The ridge defines generally the area of the computer disk 12, either five and one quarter inches or eight inches square on a side. The ridge 51 extends completely around the first part 23 except for an access area 53. The access area 53 makes it easy for a user to pick up a disk 12 placed in the first part 23 of the storage receptacle 18. A pair of indentations 55 are formed in the ridge 51 at a position opposite the access area 53 for a purpose to be described shortly.

The second part 24 of the storage receptacle 18 is of similar construction to the first part 23, being secured to the inner surface 48 of the overlay cover 33. The second part 24 has a backing portion 57 and a ridge 59, which ridge 59 extends all the way around the periphery thereof. Near the second edge 45 of the overlay cover 33, the ridge 59 has two protuberances 60 formed in the ridge 59, which protuberances 60 mate into the indentations 55 of the first part 23 when the overlay cover 33 is closed against the back cover 32 and the storage receptacle 18 sealed. The protuberances 60 and indentations 55 define, in a conventional manner, a releasable connection means for the storage receptacle 18.

When the first part 23 and second part 24 are closed against each other, the storage receptacle 18 defines a square container for one or more computer disks 12. The first part 23 is insertable into the second part 24 in a standard male-female connection. The location of the first and second parts on the back 32 and overlay covers 33 are preset so that closing the overlay cover 33 onto the back cover 32 automatically aligns the first and second parts.

Referring to FIGS. 4 and 5, the notebook 10 is placed in the storage position by initially placing the computer disk 12 in the first part 23 of the storage receptacle 18. The overlay cover 33 is pivoted about the hinge connection 37 between the back cover 32 and overlay cover 33, the second part 24 of the storage receptacle 18 mating against the first part 23 and sealing the computer disk 12 therein. The binder assembly 15 is secured to the outer surface 41 of the overlay cover 33 at the second edge 45. The rings 26 project directly upward from the back 32 and overlay covers 33. The rings 26 can be opened and the documentation 14 added or deleted as necessary. The front cover 30 is placed over the documentation 14, the spine 31 registering generally against the binder ring assembly 15 and permitting closure of the front cover 30 in a manner as would occur in a conventional notebook.

To obtain the easel position (FIGS. 1 and 2), in which the documentation 14 can be easily used while the disk 12 is in the computer, the front cover 30 is first lifted away from the documentation 14, allowing the overlay cover 33, defining the easel, and attached documentation 14 to be raised away from the back cover 32 (FIGS. 1, 2 and 3), which back cover 32 functions as a base. The storage receptacle 18 is thereby opened and the computer disk 12 removed and inserted into the computer. The free edge 39 of the front cover 30 is then inserted into the groove 21 formed at the second edge 45 of the overlay cover 33 between the retention wall 22 and second part 24 of the storage receptacle 18 (FIG. 2). A releasable connection is therefore defined between the free edge 39 of the front cover 30 and the channel or groove 21 formed on the inner surface 46 of the overlay cover 33.

Although the invention has been described with a certain degree of particularity, nothing contained herein shall serve to limit the scope of the invention as defined on the appended claims.

What is claimed is:

1. A notebook for storing computer disks and loose-leaf documentation comprising in combination:
an articulating cover including an overlay cover hingeably connected along one edge to a back cover and a front cover hingeably connected to a spine, which spine is hingeably connected to a first edge of said back cover, respective inner surfaces of said overlay and back covers having mounted thereon one part of a two-part storage receptacle for computer disks, a first part of said two-part storage receptacle including a backing panel integrally connected to one of said inner surfaces, a ridge of the first part extending a predetermined height above the backing panel and around the periphery thereof, said ridge defining generally the area of the computer disk, the ridge further being continuous around the periphery of said back portion except for an access area, at which area the ridge has a discontinuity and is contiguous with said backing panel, a second part of said two-part storage receptacle having a second backing panel and a second ridge extending around the periphery thereof, the first part insertable into the second part in a male-female connection to sealingly contain therebetween said computer disks, the one of the first and second parts of said storage receptacle associated with said overlay cover inner surface including an integrally formed channel extended along a line parallel to said hingeable connections at a second edge of said overlay cover opposite to the hinge connection of said overlay cover with said back cover, said channel for selective receipt of a free edge of said front cover to therefore define an easel position for displaying said documentation, an outer surface of said overlay cover including a loose-leaf documentation retention mechanism secured along said second edge of said overlay cover, said notebook movable between a storage position wherein said overlay cover and said first part with said channel associated therewith are matable against said back cover and said second part associated therewith to thereby retain between said two-part storage receptacle at least one of the computer disks, said document retention means positioned adjacent to the said spine and holding said documentaion releasably therein, said front cover juxtapositioning said documentation between said outer surface of said overlay cover and said front cover, and an easel position wherein said overlay cover is separated from said back cover for removal and use of said computer disks, said front cover being raised from its position adjacent said documentation to permit insertion of said free edge of said front cover into said channel of said first part of said storage receptacle along said second edge of said overlay cover.

2. A notebook for storing computer disks and documentation comprising in combination:
a back cover;
a rigid front cover hingeably connected by a rigid spine to one edge of said back cover, said front cover further having a free edge;
a rigid overlay cover hingeably connected to a second edge of said back cover;
a loose-leaf documentation retention mechanism connected to an outer surface of said overlay cover at an edge opposite the connection to said back cover; and
a storage receptacle for computer disks including a first part connected to an inner surface of said overlay cover, said first part defining a first wall of a channel, said channel further defined by a second wall connected to the inner surface of said overlay cover at a spaced distance from said first wall, said channel located at the edge of said overlay cover adjacent the retention mechanism and a second part connected to an inner surface of said back cover for sealingly receiving said first part whereby said channel on said inner surface of said overlay cover selectively and releasably receives said free edge of said front cover.

3. The invention as defined in claim 2 wherein said two-part storage receptacle is thermoformed polyethylene plastic, one part having a continuous ridge formed therein to accept said disk, a second part having a discontinuous ridge with an open access area, said first and second parts being releasably connected and matable to each other.

4. The invention as defined in claim 2 wherein said notebook is foldable into a storage position wherein said overlay cover is generally adjacent the back cover, the spine registers against the document retention mechanism and the front cover superimposes said back and overlay covers, the documentation interjacent the front and overlay covers said notebook is further foldable into an easel position wherein said free edge of said front cover is insertable into the channel.

5. A notebook for storing computer disks and loose-leaf documentation comprising in combination, a four-piece articulated cover of rectangular shape, said cover including a two-part storage receptacle connected to two of the pieces of said cover for holding disks and a document retention mechanism for holding documents, said cover being positionable in a storage position wherein the two of said pieces having the parts of said storage receptacle thereon, one adjacent each other, a third of said pieces is generally adjacent said retention mechanism and a fourth of said pieces is positioned to hold said documents interjacent to the two pieces and an easel position wherein said two pieces of said cover carrying said storage receptacle are separated into a base portion and an easel portion carrying said documentation mechanism and one of said other pieces of said cover supports said easel portion at an elevated position.

* * * * *